Sept. 6, 1960   R. M. BUCKERIDGE   2,951,576
LOAD SENSING SYSTEM FOR FLEXIBLE STRAND
SUPPORTED ENDLESS BELT CONVEYORS
Filed July 15, 1957
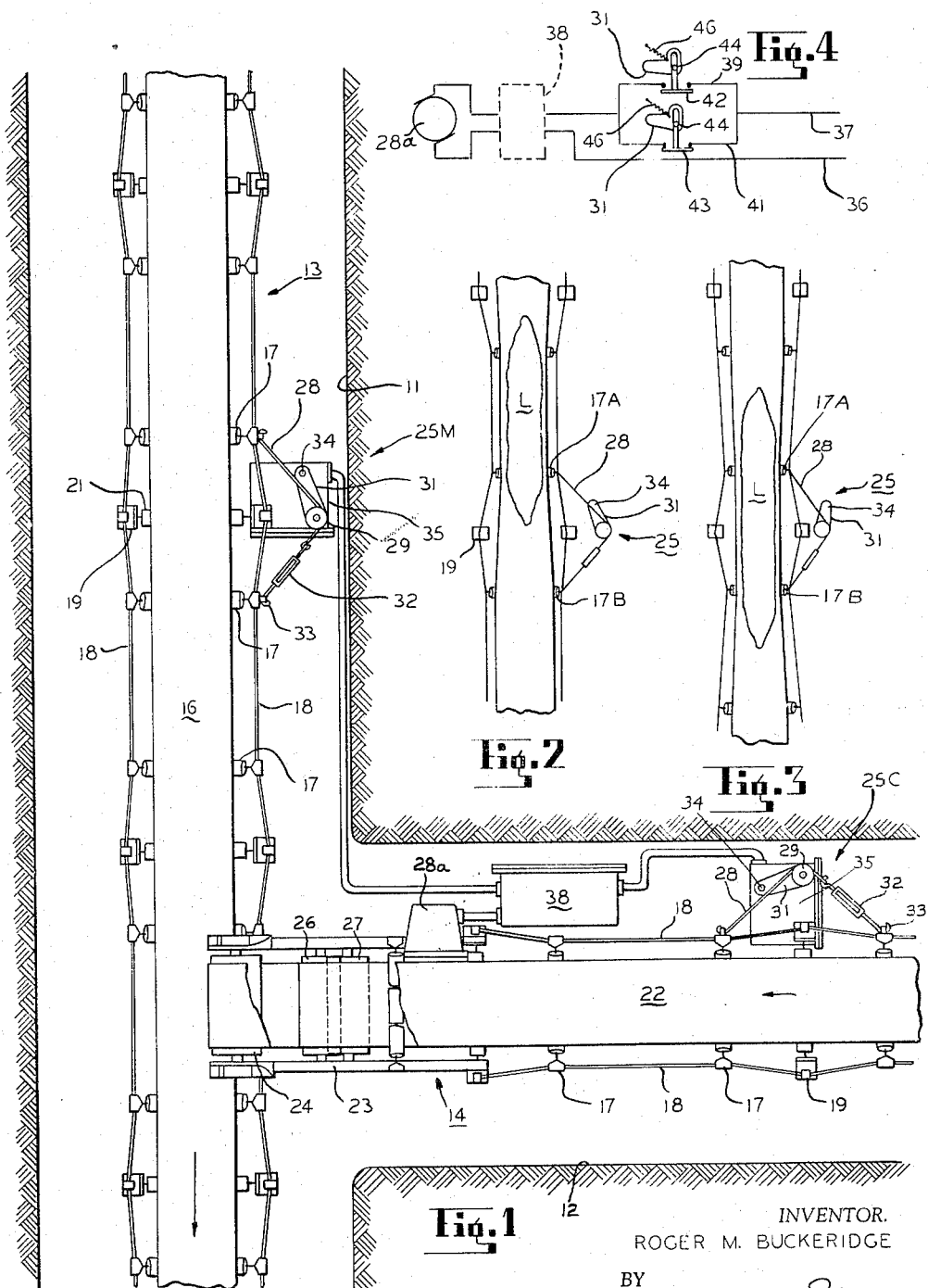
INVENTOR.
ROGER M. BUCKERIDGE
BY
Murray A. Gleeson
ATTORNEY

United States Patent Office 2,951,576
Patented Sept. 6, 1960

2,951,576

LOAD SENSING SYSTEM FOR FLEXIBLE STRAND SUPPORTED ENDLESS BELT CONVEYORS

Roger M. Buckeridge, Downers Grove, Ill., assignor to Goodman Manufacturing Company, Chicago, Ill., a corporation of Illinois Filed July 15, 1957, Ser. No. 671,793

15 Claims. (Cl. 198—37)

This invention relates generally to endless belt conveyors of the type where the conveying reach is supported upon flexible strands and more particularly to a system for sensing the loads at a transfer point between two such conveyors so that the material receiving conveyor is not over-loaded.

According to the present invention the deflection of the flexible support strands at a transfer point between a material receiving and a material discharging conveyor is employed to control the operation of the driving motor of the conveyor discharging onto the receiving conveyor. More particularly, such sensing is done at a transfer point between a main entry conveyor receiving material from a cross entry conveyor. Commonly the main entry conveyor has a greater capacity than the cross entry conveyor, and it is possible for the cross entry conveyor to discharge upon a partly loaded main entry conveyor. In situations where the main entry conveyor is fully loaded and the cross entry conveyor is also fully loaded, a sensing mechanism located inby of the point of transfer between conveyors will stop the cross entry conveyor, but when the main entry conveyor is running at only a partial or a non-loaded condition the sensing mechanism will operate to maintain the cross entry conveyor operating while loaded, partly loaded or unloaded.

According to the present invention, the sensing mechanism measures the deflection of the wire rope frames when the conveyor is loaded for more than a predetermined amount along its length. Such sensing mechanism is arranged to measure the inward deflection of the troughing roller assemblies at a pair of spaced points along the side frames, the point of measurement being preferably made at the troughing roller assemblies. The sensing mechanism includes lost motion devices cooperating with a circuit controlling the drive motor for the cross entry conveyor, each lost motion device being connected in a parallel branch of a control circuit for the drive motor.

In the specification, and the claims thereof, the expression main or gathering conveyor, discharge conveyor, and the expressions main entry and cross entry conveyor are intended to be merely of an explanatory nature rather than limitative of the invention.

With the foregoing considerations in mind, it is a principal object of this invention to provide a belt conveyor system having means for sensing the load condition at a transfer point between a gathering and discharge conveyor, so that no discharge will be made upon the gathering conveyor when it is fully loaded.

Another object is to measure the deflection of the rope side frames inby of the transfer point of main entry and cross entry conveyors to control the operation of the drive motor for the cross entry conveyor.

Other objects and important features of the invention will be apparent from a study of the specification taken with the drawing which together describe and illustrate a preferred embodiment of the invention and what is now considered to be the best mode of practicing the principles thereof. Other embodiments may be suggested to those having the benefit of the teachings herein, and such other embodiments are intended to be reserved especially as they fall within the scope and spirit of the subjoined claims.

In the drawing:

Fig. 1 is a plan view of a pair of endless belt conveyors, one of the conveyors discharging upon the other, and showing sensing means according to the present invention for regulating the discharge of one conveyor on to the other;

Fig. 2 is the plan view showing a moving load approaching the sensing means of Fig. 1;

Fig. 3 shows the moving load in a position where it has caused operation of the sensing means; and Fig. 4 is a circuit diagram showing the sensing means of Figs. 2 and 3 connected in a control circuit for the driving motor of the discharge conveyor.

Referring now to the drawing, there is shown a main entry 11 of a mine intersected by a cross entry 12. A first or main entry conveyor 13 operates within the main entry 11 and a second or cross entry conveyor 14 operates in the cross entry 12 to discharge upon the main entry conveyor 13. The main entry conveyor 13 has a conveying reach 16, the load upon which is supported on spaced troughing roller assemblies indicated generally by the reference numeral 17, each of the troughing roller assemblies being anchored at each end to a flexible strand 18 supported at intervals throughout its length upon a support stand 19. Each of the stands 19 is provided with a lower idler roller 21 for guiding and supporting the return reach, not shown, of the conveyor 13.

The discharge conveyor 14 is likewise of the type where its conveying reach 22 is supported upon the troughing roller assemblies 17, they likewise being supported from laterally spaced flexible strands 18 in turn supported at intervals throughout their lengths upon the support standards 19.

The cross entry or discharge conveyor 14 has an end section 23 including an idler pulley 24 where the conveying reach 22 is reversed in direction, the return reach being wrapped about a snubbing pulley 26 and a driving pulley 27 driven by a motor 28a mounted upon the framework of the end section 23.

Sensing means 25 are disposed at points inby of the point of transfer from the cross entry conveyor 14 to the main entry conveyor 13 to sense the presence of a load on each conveyor at points inby of such point of transfer. Such means are indicated generally by the reference numeral 25M for main entry conveyor 13 and 25C for cross entry conveyor 14. Each sensing means includes a sensing strand 28 anchored to a location on the flexible strand 18 at an end of one troughing roller assembly 17, the sensing strand 28 being guided about an idler sheave 29 mounted at one end of a swinging arm 31. The other end of the strand 28 is connected to a turnbuckle 32 having a hook 33 for connection to another location on the strand means 18 that is spaced from the first location at an end of another troughing roller assembly 17 spaced from the one troughing roller 17 to which the strand 28 is anchored. Each of the swinging arms 31 are pivotally mounted for swinging movement about a pivot axis or point 34 on a housing 35.

In the example seen in Figs. 1, 2 and 3 the sensing strand 28 is anchored to a troughing roller assembly 17 disposed at points respectively immediately inby and outby of a support standard 19. However, the sensing strand 28 can equally as well be disposed at troughing roller assemblies other distances apart along the support strands 18 and at other points with respect to the support stand 19.

Irrespective of the precise manner in which the sensing cable 28 is anchored along the strands 18, the function of such sensing cable 28 is to measure the deflection of the support cables 18 by reason of a load L upon each of the conveyors 13 and 14. As the load L approaches the sensing means 25, the initial deflection of the one troughing roller assembly 17, also labeled 17A as seen in Fig. 2, causes a slight rocking of the support arm 31 about the respective pivot point 34. The initial rocking movement of the support arm 31 increases as the load L moves towards the other troughing roller 17 to the other side of the support stand 19, such troughing roller assembly also being marked 17B, and when the load L has reached a position as seen in Fig. 3, the arm 31 will have rocked to the position shown.

Referring now to Fig. 4, there is shown a pair of power leads 36 and 37 for the motor 28a driving the cross entry conveyor 14. The motor 28a is connected to the power leads 36 and 37 through a starting box 38, see also Fig. 1, and lead 37 has a pair of parallel leads 39 and 41 connected therein. Leads 39 and 41 have contacts 42 and 43 respectively therein, contact 42 being opened by the main conveyor belt sensing means 25M and contact 43 being controlled by the cross entry sensing means 25C.

Each of the contacts are identical in form, and each is opened by the movement of the respective arm 31 to the position seen in Fig. 3, each such arm having a lost motion connection 44 with the respective contacts 42 and 43, as seen in Fig. 4, with the movement of each arm 31 being partly restrained by a spring 46.

By reason of the lost motion connections 44 between the rocking arm 31 and the contact 42 or 43, a limited amount of swinging movement of the arm 31 may be had incident to the more or less concentrated load upon the conveyors in moving past the sensing mechanism, be it 25C or 25M. However, when the load is of a length so as to cause rocking of the arm 31, as seen in Fig. 3, the lost motion connection 44 will be completely taken up, so that the contact 42 or 43 or both of them will be opened.

It may be noted that the circuit to the motor 28a is open only when there is sufficient load upon the mother conveyor 13 to cause actuation of its sensing means 25M, and when there is sufficient load upon the cross entry conveyor 14 to cause operation of its sensing means 25C. When there is a load on only one of the conveyors, the circuit to the motor 28a will at all times be energized, and it is readily apparent that motor 28a will be maintained in energized condition when there is no load upon either conveyor.

The load sensing means according to the present invention is readily disposed in position to one side of the conveyor, and makes use of the deflection of the support strands incident to the load upon the conveyor. It is unnecessary to employ load sensing devices actually in contact with the load, which devices require supports for mounting in position over the conveying reach.

The scope of the invention is defined by the claims here appended.

I claim as my invention:

1. In a belt conveyor system having endless conveyor belts where the conveying reaches are supported upon troughing roller assemblies which deflect in accordance with the load on the conveying reach, a gathering belt conveyor of the type referred to, a second belt conveyor of the type referred to discharging on to said gathering conveyor at a transfer point, power means for driving said second conveyor, means at a point inby of the transfer point and disposed at each of said conveyors responsive to the deflection of the troughing roller assembly by the load on the conveying reach at such inby point of each conveyor, and means deenergizing said power means when said deflection responsive means are simultaneously responding to such deflection including a circuit to said power means having a pair of branches therein, each having a deflection responsive means therein, and means enabling the deflection responsive means to respond to loads at each inby point less than a predetermined amount without deenergizing said power means.

2. In a belt conveyor system having endless conveyor belts where the conveying reaches are supported upon troughing roller assemblies which deflect in accordance with the load on the conveying reach, a gathering belt conveyor of the type referred to, a second belt conveyor of the type referred to discharging on to said gathering conveyor at a transfer point, power means for driving said second conveyor, means at a point inby of the transfer point and disposed at each of said conveyors responsive to the deflection of the troughing roller assembly by the load on the conveying reach at such inby point of each conveyor, and means deenergizing said power means when said deflection responsive means are simultaneously responding to such deflection comprising a circuit to said power means including a pair of branches each having a deflection responsive means therein.

3. In a belt conveyor system having endless conveyor belts where the conveying reaches are supported upon flexible strand means and troughing roller assemblies which deflect in accordance with the load on the conveying reach, a gathering belt conveyor of the type referred to, a second belt conveyor of the type referred to discharging on to said gathering conveyor at a transfer point, power means for driving said second conveyor, means at a point inby of the transfer point and disposed at each of said conveyors responsive to the deflection of said flexible strand means by the load on the conveying reach at such inby points, and means deenergizing said power means when said deflection responsive means are simultaneously responding to such deflection including means at each of said deflection responsive means enabling a localized load to pass said inby points without affecting the deflection responsive means.

4. In a belt conveyor system having endless conveyor belts where the conveying reaches are supported upon flexible strand means and troughing roller assemblies which deflect in accordance with the load on the conveying reach, a gathering belt conveyor of the type referred to, a second belt conveyor of the type referred to discharging on to said gathering conveyor at a transfer point, power means for driving said second conveyor, means at a point inby of the transfer point and disposed at each of said conveyors responsive to the deflection of said flexible strand means by the load on the conveying reach at such inby points, and means deenergizing said power means when said deflection responsive means are simultaneously responding to such deflection, including a circuit having said deflection responsive means therein.

5. In a belt conveyor system having endless conveyor belts where the conveying reaches are supported upon flexible strand means and troughing roller assemblies which deflect in accordance with the load on the conveying reach, a gathering belt conveyor of the type referred to, a second belt conveyor of the type referred to discharging on to said gathering conveyor at a transfer point, power means for driving said second conveyor, means at a point inby of the transfer point and disposed at each of said conveyors responsive to the deflection of said flexible strand means by the load on the conveying reach at such inby points, and means deenergizing said power means when said deflection responsive means are simultaneously responding to such deflection.

6. In a belt conveyor system having endless conveyor belts where the conveying reaches thereof are supported upon flexible strand means, a gathering belt conveyor of the type referred to, a second belt conveyor of the type referred to discharging on to said gathering conveyor at a transfer point, power means for driving said second conveyor, means at a point inby of the transfer point and disposed at each of said conveyors responsive to the deflection of said flexible strand means by the load on the conveying reach at such inby points, and means deenergizing said power means when said deflection responsive means are simultaneously responding to such deflection including a circuit to said power means having a pair of branches therein, each having a deflection responsive means therein, and means enabling the deflection responsive means to operate by loads at each inby point less than a predetermined amount without deenergizing said power means.

7. In a belt conveyor conveyor system having endless conveyor belts where the conveying reaches thereof are supported upon flexible strand means, a gathering belt conveyor of the type referred to, a second belt conveyor of the type referred to discharging on to said gathering conveyor at a transfer point, power means for driving said second conveyor, means at a point inby of said transfer point and disposed at each of said conveyors responsive to the deflection of said flexible strand means by the load on the conveying reach at such inby points, and means deenergizing said power means when said deflection responsive means are simultaneously responding to such deflection comprising a circuit to said power means including a pair of branches each having a deflection responsive means therein.

8. In a belt conveyor system having endless conveyor belts where the conveying reaches thereof are supported upon flexible strand means, a gathering belt conveyor of the type referred to, a second belt conveyor of the type referred to discharging on to said gathering conveyor at a transfer point, power means at a point for driving said second conveyor, means inby of said transfer point and disposed at each of said conveyors responsive to the deflection of said flexible strand means by the load on the conveying reach at such inby points, and means deenergizing said power means when said deflection responsive means are simultaneously responding to such deflection including means at each of said deflection responsive means enabling a localized load to pass said inby points without affecting the deflection responsive means.

9. In a belt conveyor system having endless conveyor belts where the conveying reaches thereof are supported upon flexible strand means, a gathering belt conveyor of the type referred to, a second belt conveyor of the type referred to discharging on to said gathering conveyor at a transfer point, power means for driving said second conveyor, means at a point inby of said transfer point and disposed at each of said conveyors responsive to the deflection of said flexible strand means by the load on the conveying reach at such inby points, and means deenergizing said power means when said deflection responsive means are simultaneously responding to such deflection including a circuit having said deflection responsive means therein.

10. In a belt conveyor system having endless conveyor belts where the conveying reaches thereof are supported upon flexible strand means, a gathering belt conveyor of the type referred to, a second belt conveyor of the type referred to discharging on to said gathering conveyor at a transfer point, power means for driving said second conveyor, means at a point inby of said transfer point and disposed at each of said conveyors responsive to the deflection of said flexible strand means by the load on the conveying reach at such inby points, and means deenergizing said power means when said deflection responding to such deflection means are simultaneously responsive.

11. In a flexible sideframe conveyor having a pair of laterally spaced generally parallel elongated flexible strand means trained along a given course, at least a pair of elongated troughing assemblies extending between the strand means at locations thereon that are longitudinally spaced relative to the given course for effectively supporting a conveying reach of a conveyor belt for movement therealong, said strand means being deflectable at the said spaced locations in accordance with a load on such conveying reach, and load-sensing means connected to one of the strand means at each of the said spaced locations thereon, said load-sensing means being operable in response to deflection of the strand means at the said spaced locations for sensing the approach of a load being carried by such conveying reach.

12. In a flexible sideframe conveyor having elongated flexible strand means trained along a given course for effectively supporting a conveyor belt, said strand means being deflectable at locations thereon that are longitudinally spaced relative to the given course in accordance with a load being carried by such conveyor belt, and load-sensing means connected to the said spaced locations on the strand means, said load-sensing means being operable in response to deflection of the strand means at the spaced locations to sense an approaching load being carried by such conveying reach.

13. In a flexible sideframe conveyor having elongated flexible strand means trained along a given course for effectively supporting a conveyor belt, said strand means being deflectable at a location thereon in accordance with a load being carried by such conveyor belt, load-sensing means operable in response to deflection of the strand means at the said location to sense an approaching load being carried by such conveyor belt, and means for connecting the load-sensing means to the strand means at the said location.

14. In a flexible sideframe conveyor having elongated flexible strand means and at least a pair of elongated troughing assemblies carried by said strand means at spaced locations thereon for effectively supporting a conveyor belt therefrom, said strand means being deflectable at the said spaced locations in accordance with a load on such conveyor belt, the improvement comprising, in combination with the strand means, load-sensing means connected to the strand means at each of the said spaced locations thereon and operable in response to deflection of the strand means at the said locations to sense an approaching load being carried by such conveyor belt.

15. A flexible sideframe conveyor including elongated flexible strand means for supporting a conveyor belt, said strand means having a portion thereof that is deflectable in accordance with a load on such conveyor belt, and load-sensing means connected to the deflectable portion of the strand means at spaced locations thereon, said load-sensing means being operable in response to deflection of the said portion of the strand means for sensing an approaching load being carried by such conveyor belt.

References Cited in the file of this patent

UNITED STATES PATENTS

| | | |
|---|---|---|
| 1,579,545 | Langsdorf | Apr. 6, 1926 |
| 2,768,657 | Kindseth | Oct. 30, 1956 |
| 2,773,257 | Craggs et al. | Dec. 4, 1956 |
| 2,883,035 | Erisman | Apr. 21, 1959 |